United States Patent [19]

Brown

[11] Patent Number: 4,967,963
[45] Date of Patent: Nov. 6, 1990

[54] SAW GUIDE LUBRICATION SYSTEM

[75] Inventor: Ernest W. Brown, Texarkana, Ark.

[73] Assignee: International Paper Company, Purchase, N.Y.

[21] Appl. No.: 212,644

[22] Filed: Jun. 28, 1988

[51] Int. Cl.$^5$ .................................................. B05B 7/06
[52] U.S. Cl. .................................. 239/424.5; 239/428; 83/169
[58] Field of Search ............ 83/169; 239/424.5, 419.3, 239/428, 419.5, 416.4, 416.5; 408/56, 61

[56] References Cited

U.S. PATENT DOCUMENTS

| | | | |
|---|---|---|---|
| 1,105,804 | 8/1914 | Lanton | 239/428 X |
| 1,766,663 | 6/1930 | McClure | 83/169 |
| 1,944,577 | 1/1934 | Rose | 83/169 |
| 2,176,682 | 10/1939 | Pedrick | 239/9 |
| 2,519,939 | 8/1950 | Smith | 239/424.5 X |
| 2,722,245 | 11/1955 | Clampitt | 83/169 X |
| 2,879,948 | 3/1959 | Seibel | 239/428 X |
| 3,009,826 | 11/1961 | Straughn et al. | |
| 3,156,274 | 11/1964 | Golick | |
| 3,188,010 | 6/1965 | James | 239/424.5 X |
| 3,310,240 | 3/1967 | Grundman | 230/428 X |
| 3,478,843 | 11/1969 | Eckardt | |
| 3,577,808 | 5/1971 | Visser | 83/169 X |
| 3,674,065 | 7/1972 | Fairfield, Jr. et al. | |
| 4,505,431 | 3/1985 | Huffman | |
| 4,676,557 | 6/1987 | Shope et al. | 83/169 X |

FOREIGN PATENT DOCUMENTS 76432  6/1948  Czechoslovakia .

Primary Examiner—Andres Kashnikow
Assistant Examiner—Kevin P. Weldon
Attorney, Agent, or Firm—Walt T. Zielinski

[57] ABSTRACT

A saw guide is provided with a mixture of air, oil and water to lubricate and cool the saw and guide. The lubricant mixture is developed by a liquids mixer constructed around an oxyacetylene cutting tip. Greatly reduced water consumption is observed resulting in a drier working environment and reducing the amount of clean-up required.

4 Claims, 3 Drawing Sheets

SAW GUIDE LUBRICATION SYSTEM

BACKGROUND OF THE INVENTION

This invention relates to the art of lubrication, and is particularly directed to a mixer for developing an air-/oil/water mixture for delivery to saw guides.

Large circular wood saw blades are often provided with guides in the vicinity of the material being sawn to stabilize the blade, and to permit the use of thinner blades, which, having a smaller kerf, produce less waste. Saw guide lubrication has traditionally been accomplished by injecting large volumes of water into guide pads on either side of a moving saw blade, which causes the saw to "float" on a film of water. One such system is shown in U.S. Pat. No. 3,674,065.

The water creates many problems. The fuel value of the resulting sawdust is reduced; an excessive amount of water penetrates the lumber requiring additional time and energy in lumber drying; water enters bearings and other machine parts, creating additional maintenance problems; mill floors are constantly wet and thus are safety hazards. The water that runs off from the mill creates an environmental clean-up problem. All of these problems are serious; furthermore, water is not a good lubricant.

Recently developed saw lubricators utilize a film of oil for the purpose of lubrication and a small amount of water on demand for saw cooling. Both the Ukiah and Schurman systems utilize complex pumping and metering devices to achieve the proper ratio of oil, water and air onto the saws and guides.

The present invention provides a very simple and economical but yet effective saw guide lubrication system. The invention utilizes a device created by a VICTOR or other brand of burning tip, which is adapted to inject water into oil in the low pressure area of the device. The resulting emulsion of air, oil and water is easily carried through a simple valving arrangement to the saw guides.

The benefits of this system over existing systems are as follows:

1. Water consumption is reduced approximately 90 to 95%, resulting in a drier working environment, higher BTU value of sawdust, and reduced environmental clean-up problems.

2. An air-oil-water emulsion is used as the lubricant rather than air of water, allowing the saw guides to be operated with much tighter tolerances, resulting in more accurate sawing. The oil also insures that wood resin does not build up on the saw blade, thus creating additional heat.

3. The above claims are also made for the Schurman Machine and Ukiah Machine lubrication system. This invention, however, uniquely utilizes the device effect created by a readily available burning tip, to mix oil, air and water in situ. Each ingredient is metered to the right proportion upstream of the mixing chamber. This invention avoids the need for pumps, computers or other exotic means of controlling the exact ratios of air, oil and water.

4. The invention is contained in a compact package that can be directly attached to the existing piece of equipment that it serves. By comparison, the other known systems, being bulky and requiring large floor space, sometimes have to be located at a distance from the equipment. This separation can cause the premixed oil, air and water to separate and defeat the purpose of the apparatus.

In view of the foregoing, it is an object of this invention to provide a saw guide lubrication system with a simple yet effective lubricant mixer capable of mixing oil, water and air in various proportions. A related object is to provide such a mixer that is small and inexpensive.

A lubricant mixer according to the present invention comprises means defining an outlet nozzle, means defining separate respective inlets for air, oil and water, a liquids mixer for mixing the oil and water, said mixer comprising a body having a central passage in communication with said oil inlet, and a plurality of outer passages in communication with said water inlet, said mixer extending into said outlet nozzle, and means defining a chamber surrounding said mixer and in communication with both said air inlet and said outlet nozzle.

DESCRIPTION OF THE PREFERRED EMBODIMENT

Figure 1:
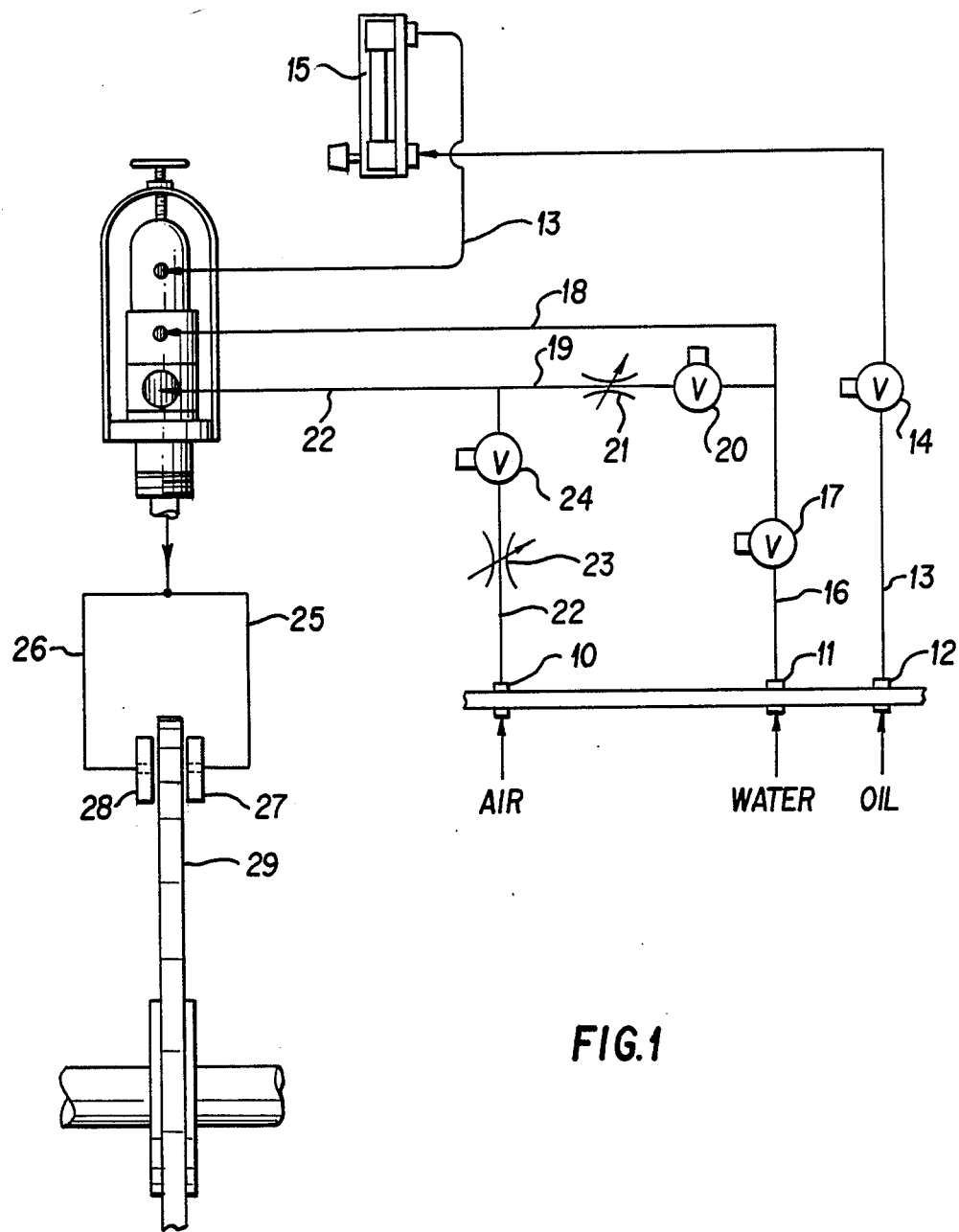
FIG. 1 is a schematic of the saw guide lubrication system of which the mixer is a part.

FIG. 1 is a schematic of a fluid circuit including the inventive mixer. Supplies of air, water and oil under pressure are connected to the system at inlet fittings 10, 11 and 12 respectively. The oil line 13 is connected via a solenoid-operated shutoff valve 14 and a regulator 15 with the oil port of the lubricant mixer 30, described in detail below. The water line 16 has a shutoff valve 17 upstream of a junction at which it branches into lines 18 and 19. The line 18 is connected directly to the lubricant mixer, while the line 19 extends through a solenoid-operated "water flood" valve 20 and a flow controller 21 to a tee at which it joins the air line 22 (the air line is also provided with a flow control 23 and a shutoff valve 24). The air line downstream of the tee is connected to the air inlet of the lubricant mixer 30.

The outlet of the mixer is connected via lines 25 and 26 to respective guide blocks 27 and 28 on either side of a saw blade 29. Operation of the system is described further below.

Figure 2:
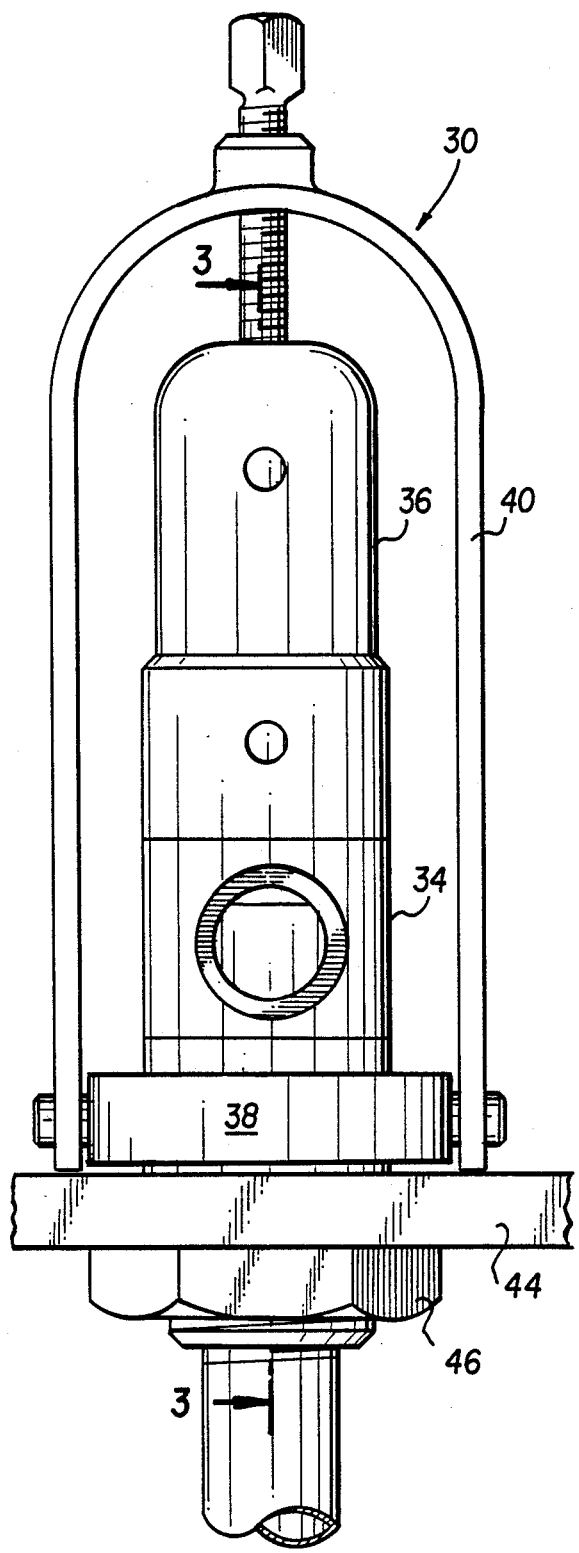
FIG. 2 is a side elevation of a lubricant mixer embodying the invention.
Figure 3:
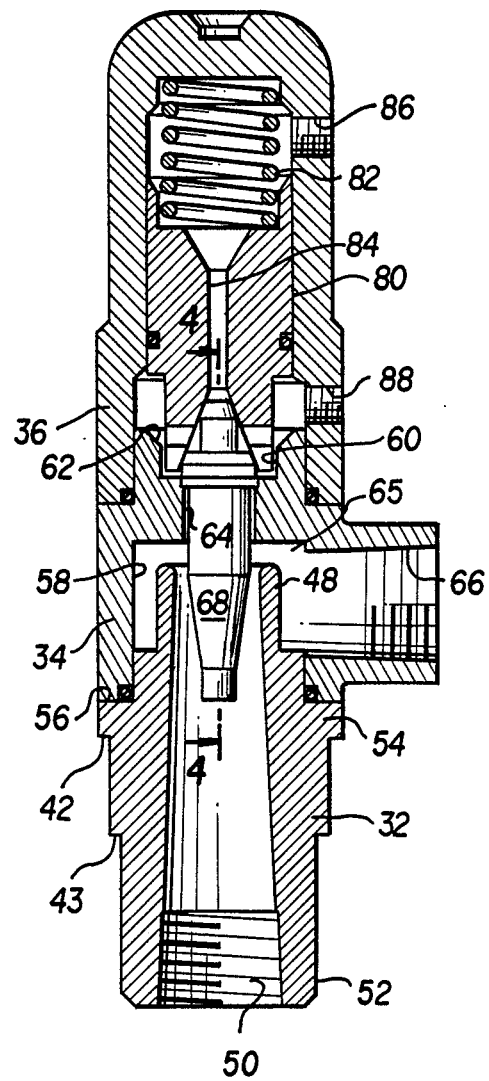
FIG. 3 is a sectional side view of the mixer, taken along the line 3—3 in FIG. 2.
Figure 4:
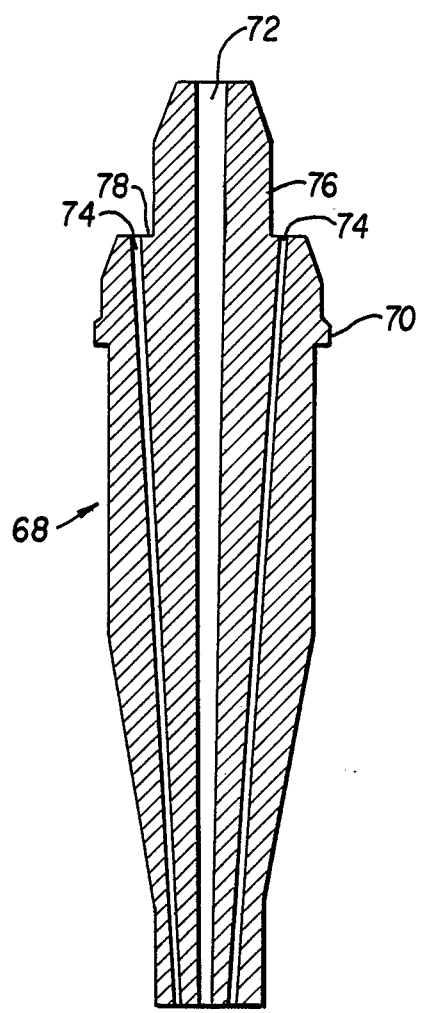
FIG. 4 is a sectional view of a nozzle, taken along the line 4—4 in FIG. 3.

FIGS. 2-4 show in details of the lubricant mixer 30. The mixer comprises a base 32, an intermediate body 34 and a cap 36 which fit together in series and are held in appostion by means of a ring 38 and bail 40 pivotally connected thereto; the bail 40 has a tightening screw extending along the axis of the mixer for maintaining the major elements of the mixer in compression. The ring fits beneath the first shoulder 42 of the base 32. A second shoulder 43 is provided for mounting purposes—as shown in FIG. 2, the second shoulder provides an abutment when the mixer is mounted through a hole in a supporting plate 44 and retained therein by means of a nut 46.

Fluid leakage from the interfaces of elements 32, 34 and 36 is prevented by O-rings maintained in compression between the elements.

The base 32 comprises a sleeve defining a divergent nozzle 46 extending the full length of the base. The upstream end of the base terminates at a short sleeve or shroud 48, while the downstream end is provided with internal and external threads 50, 52 respectively. Between the two ends, an external rib 54 defines a mating shoulder 56 against which the intermediate body seats.

The intermediate body 34 has a downstream end with a bore 58 sized to receive the shoulder 56 of the base, and an upstream end having an enlarged recess 60 internally chamfered at 62 defined therein. The recess leads to a through bore 64 of substantially smaller diameter, which opens downstream into a large interior air chamber 65 which surrounds the shroud 48 and communicates with an internally threaded lateral air inlet 66.

A liquids mixer 68 extends loosely through the bore, as shown in FIG. 3, and seats within the recess against the upstream end of the bore, so that its downstream end extends concentrically through the air chamber, the shroud, and into the divergent nozzle of the base.

Details of the liquids mixer are shown in FIG. 4. This mixer is an off-the-shelf acetylene burning tip of the "Victor" type. The outwardly protruding circumferential rib 70 provides an abutment for seating within the recess. A converging passage 72 extends the length of the mixer along its axis, and is surrounded by eight smaller passages 74 which not only have converging diameters, but whose axes also converge in the downstream direction toward that of the central passage. The upstream end of the liquids mixer has a chamfered nose 76 through which extends the central passage, but not the smaller passages, which terminate at the annular face 78 surrounding the base of the nose.

The upstream end of the central passage 72 is segregated from that of the passages 74 by means of a sliding body 80, FIG. 4, received within the cap 36, which is biased by a spring 82 against the chamfered portion of the nose of the liquids mixer, thus both clamping the mixer in place and also providing a liquid-tight interface. The sliding body has an axially extending through passage 84, chamfered at both ends, and a counterbored upstream end for receiving one end of the spring 82, the other end of which bears against the upper end of the cap.

The cap itself has two lateral threaded holes 86 and 88, provided as inlets for oil and water respectively, leading to respective interior spaces below and above the sliding body. The upper space thus communicates via the passage 84 with the central passage of the liquids mixer, while the lower space communicates with the smaller surrounding passages.

In operation air, oil and water are delivered in controlled volumes to the mixer via the three separate, parallel lines 13, 18 and 22, when the shutoff valves are opened. Regulated air enters through its valve to the air inlet port of the device, and flows around the shroud and over the downstream end of the liquids mixer, creating a vacuum within the divergent nozzle.

Water at line pressure enters the water port 88, while oil is fed to the port 86. Oil passes through the center passage of the tip while water sprayed from the other passages intersects the oil stream, creating an emulsion that is carried by the air stream to the saw guides. The small portion of water evaporates from the saw, cooling it while leaving a thin oil film for lubrication. Thus very little water is transferred to either the sawdust or the wood, reducing both operational costs and environmental contamination. In a typical eight hour shift for twenty-four 20" diameter saws, the following consumptions were observed: 1.5 to 2.0 gallons of rock drill oil, 50 SCFM air, one to five gallons of water.

When the press rolls of the saw box are holding wood, signaling that wood is being sawn, the water flood valve 20 opens and saturates the air being delivered to the mixer. The level of saturation is controlled by the restriction 21, which is manually adjusted to maximize evaporative cooling.

Inasmuch as the foregoing is merely illustrative of the invention, which may be subject to modifications and variations, the scope of the invention should be measured by the following claims.

I claim:

1. A device for mixing air, oil and water, comprising
means defining an outlet nozzle, said nozzle being divergent in a downstream direction,
means defining separate respective inlets for air, oil and water,
a liquids mixer for mixing the oil and water, said mixer comprising a body having a central passage in communication with said oil inlet, and a plurality of outer passages in communication with said water inlet, said mixer extending into said outlet nozzle, said outer passages converging in the downstream direction toward the axis of the central passage, and
means defining a chamber surrounding said mixer and in communication with both said air inlet an said outlet nozzle,
wherein said mixer has a nose at the upstream end thereof through which said central passage, but not said outer passages, extend, and further comprising
a sliding body abutting said nose, said sliding body defining a through central passage in communication with said oil inlet at one end and said central passage at the other end, and
means for biasing the sliding body against the nose, thereby segregating the oil and water flows upstream of the mixer.

2. The invention of claim 1, further comprising an annular shroud within said chamber, said shroud forming the upstream end of said divergent nozzle, and being disposed between said air inlet and said liquids mixer.

3. A device for mixing air, oil and water, comprising
means defining an outlet nozzle, said nozzle being divergent in a downstream direction,
means defining separate respective inlets for air, oil and water,
a liquids mixer for mixing the oil and water, said mixer comprising a body having a central passage in communication with said oil inlet, and a plurality of outer passages in communication with said water inlet, said mixer extending into said outlet nozzle, said outer passages converging in the downstream direction toward the axis of the central passage, and
means defining a chamber surrounding said mixer and in communication with both said air inlet and said outlet nozzle, and
a shroud extending around the mixer within said air chamber.

4. A device for mixing air, oil and water, comprising
means defining an outlet nozzle, said nozzle being divergent in a downstream direction,
means defining separate respective inlets for air, oil and water,
a liquids mixer for mixing the oil and water, said mixer comprising a body having a central passage in communication with said oil inlet, and a plurality of outer passages in communication with said water inlet, said mixer extending into said outlet nozzle, said outer passages converging in the downsteam direction toward the axis of the central passage, means defining a chamber surrounding said mixer and in communication with both said air inlet and said outlet nozzle, and an annular shroud within said chamber, said shroud forming the upstream end of said divergent nozzle, and being disposed between said air inlet and said liquids mixer.

* * * * *